US012595741B2

(12) United States Patent
Zelesky

(10) Patent No.: US 12,595,741 B2
(45) Date of Patent: Apr. 7, 2026

(54) DIRT AND DUST FREE TURBINE VANE COOLING

(71) Applicant: RTX Corporation, Farmington, CT (US)

(72) Inventor: Mark F. Zelesky, Bolton, CT (US)

(73) Assignee: RTX CORPORATION, Farmington, CT (US)

(*) Notice: Subject to any disclaimer, the term of this patent is extended or adjusted under 35 U.S.C. 154(b) by 0 days.

(21) Appl. No.: 18/463,475

(22) Filed: Sep. 8, 2023

(65) Prior Publication Data

US 2025/0084765 A1 Mar. 13, 2025

(51) Int. Cl.
*F01D 5/18* (2006.01)

(52) U.S. Cl.
CPC ........ *F01D 5/186* (2013.01); *F05D 2260/201* (2013.01); *F05D 2260/202* (2013.01); *F05D 2260/607* (2013.01)

(58) Field of Classification Search
CPC .......... F01D 5/189; F01D 5/188; F01D 5/183; F01D 5/185
See application file for complete search history.

(56) References Cited

U.S. PATENT DOCUMENTS

| | | | | |
|---|---|---|---|---|
| 8,142,153 | B1 * | 3/2012 | Liang | F01D 9/04 416/97 R |
| 11,448,093 | B2 | 9/2022 | Whitaker et al. | |
| 11,525,397 | B2 | 12/2022 | Leary et al. | |
| 2004/0170498 | A1 | 9/2004 | Peterman et al. | |
| 2005/0089393 | A1 * | 4/2005 | Zatorski | F01D 5/187 415/115 |
| 2005/0286997 | A1 * | 12/2005 | Kessler | F01D 9/065 415/115 |
| 2016/0258306 | A1 | 9/2016 | Spangler et al. | |
| 2017/0167274 | A1 * | 6/2017 | Itzel | B23K 26/144 |
| 2021/0087979 | A1 * | 3/2021 | Packer | B33Y 80/00 |

FOREIGN PATENT DOCUMENTS

| | | | |
|---|---|---|---|
| EP | 0568226 | A1 | 11/1993 |

OTHER PUBLICATIONS

Extended European Search Report for EP Application No. 24199026.6, dated Feb. 4, 2025, pp. 1-8.

* cited by examiner

*Primary Examiner* — Phutthiwat Wongwian
*Assistant Examiner* — Roberto Toshiharu Igue
(74) *Attorney, Agent, or Firm* — CANTOR COLBURN LLP

(57) ABSTRACT

Vane assemblies and gas turbine engines having vane assemblies are described. The vane assemblies include a vane having outer and inner diameter ends and at least a leading-edge cavity therein. A direction of flow through the leading-edge cavity is from the outer diameter end toward the inner diameter end. An inner diameter platform is arranged at the inner diameter end of the vane and includes an inner diameter flow path having an exit at an aft side of the inner diameter platform. The inner diameter platform includes an inner diameter flow aperture fluidly coupling the leading-edge cavity and the inner diameter flow path. A baffle is installed within the leading-edge cavity and arranged to reduce a cross-sectional area in the direction of flow of the leading-edge cavity such that the leading-edge cavity has a larger cross-sectional area proximate the outer diameter end than at the inner diameter end.

20 Claims, 13 Drawing Sheets

DIRT AND DUST FREE TURBINE VANE COOLING

BACKGROUND

The subject matter disclosed herein generally relates to cooling flow in gas turbine engines and, more particularly, to cooling of vanes in turbine sections of such gas turbine engines and associated cooling schemes.

In gas turbine engines, tangential onboard injectors (TOBI) are used to direct cooling air toward a rotating disc that supports a plurality of turbine blades. The TOBI is configured to swirl secondary flow cooling air in a direction that is parallel to or along a direction of rotation of the rotating disc. Because of this, leakage flow into a primary or main gaspath that flows through the turbine section will be substantially parallel. That is, TOBI cooling air that leaks from the cooling areas below the gaspath are inserted into the gaspath in the same swirl direction as the rotating rotor.

Gas turbine first stage vanes are typically impingement cooled and may be prone to fine dirt and dust (particulate matter) blockage and/or build up of such particulate matter may occur forming an insulation later of the cooled side of the vane, and thus resulting in increased heating thereof. Impingement cooling directs momentum at the back wall being cooled (i.e., interior surface of an airfoil vane) and such directed momentum of particulates may cause deposition of such particulates on the wall that is being cooled and or may lodge within in cooling holes (impingement or film). Improved cooling schemes directed to prevention of particulate build up and/or improved cooling capabilities may provide for various advantages, such as increased part life, lower part failure and/or damage, and reducing impacts of particulate matter in cooling flow streams.

SUMMARY

According to embodiments of the present disclosure, vane assemblies are provided. The vane assemblies include a vane having an outer diameter end and an inner diameter end, the vane defining at least a leading-edge cavity therein, and a direction of flow through the leading-edge cavity is from the outer diameter end toward the inner diameter end. An inner diameter platform is arranged at the inner diameter end of the vane, the inner diameter platform having an inner diameter flow path having an exit at an aft side of the inner diameter platform, the inner diameter platform having an inner diameter flow aperture fluidly coupling the leading-edge cavity and the inner diameter flow path. A baffle is installed within the leading-edge cavity, the baffle arranged to reduce a cross-sectional area in the direction of flow of the leading-edge cavity such that the leading-edge cavity has a larger cross-sectional area proximate the outer diameter end than at the inner diameter end.

In addition to one or more of the features described above, or as an alternative, further embodiments of the vane assemblies may include a purge cavity defined within the inner diameter platform between the inner diameter flow aperture and the inner diameter flow path.

In addition to one or more of the features described above, or as an alternative, further embodiments of the vane assemblies may include a second vane having a second leading-edge cavity fluidly coupled to the purge cavity by a second inner diameter flow aperture that fluidly couples the purge cavity to the second leading-edge cavity.

In addition to one or more of the features described above, or as an alternative, further embodiments of the vane assemblies may include that the purge cavity is fluidly coupled to a plurality of leading-edge cavities of a plurality of respective vanes.

In addition to one or more of the features described above, or as an alternative, further embodiments of the vane assemblies may include that the inner diameter flow path is curved such that airflow passing through the inner diameter flow path is turned as it flows from the inner diameter flow aperture to an exit of the inner diameter flow path.

In addition to one or more of the features described above, or as an alternative, further embodiments of the vane assemblies may include that the vane comprises a plurality of film cooling holes formed in a wall of the vane defining the leading-edge cavity.

In addition to one or more of the features described above, or as an alternative, further embodiments of the vane assemblies may include that the film cooling holes are angled at an angle of 90° or greater relative to the direction of flow.

In addition to one or more of the features described above, or as an alternative, further embodiments of the vane assemblies may include that the angle is 145° or greater.

In addition to one or more of the features described above, or as an alternative, further embodiments of the vane assemblies may include that the baffle comprises a plurality of impingement holes arranged to direct an impingement flow at an internal surface of a wall of the vane that defines the leading-edge cavity.

In addition to one or more of the features described above, or as an alternative, further embodiments of the vane assemblies may include that the vane comprises a plurality of thermal transfer augmentation features arranged on an internal surface of the vane defining the leading-edge cavity.

According to some embodiments, gas turbine engines are provided. The gas turbine engines include a turbine section having at least one vane assembly and at least one rotor arranged downstream from the at least one vane assembly, with a rotor cavity defined between the at least one vane assembly and the at least one rotor. The at least one vane assembly includes a vane having an outer diameter end and an inner diameter end, the vane defining at least a leading-edge cavity therein, and a direction of flow through the leading-edge cavity is from the outer diameter end toward the inner diameter end. An inner diameter platform is arranged at the inner diameter end of the vane, the inner diameter platform having an inner diameter flow path with an exit at an aft side of the inner diameter platform that fluidly couples to the rotor cavity, the inner diameter platform having an inner diameter flow aperture fluidly coupling the leading-edge cavity and the inner diameter flow path. A baffle is installed within the leading-edge cavity, the baffle arranged to reduce a cross-sectional area in the direction of flow of the leading-edge cavity such that the leading-edge cavity has a larger cross-sectional area proximate the outer diameter end than at the inner diameter end.

In addition to one or more of the features described above, or as an alternative, further embodiments of the gas turbine engine may include a purge cavity defined within the inner diameter platform between the inner diameter flow aperture and the inner diameter flow path.

In addition to one or more of the features described above, or as an alternative, further embodiments of the gas turbine engine may include a second vane having a second leading-edge cavity fluidly coupled to the purge cavity by a second inner diameter flow aperture that fluidly couples the purge cavity to the second leading-edge cavity.

In addition to one or more of the features described above, or as an alternative, further embodiments of the gas turbine engine may include that the purge cavity is fluidly coupled to a plurality of leading-edge cavities of a plurality of respective vanes.

In addition to one or more of the features described above, or as an alternative, further embodiments of the gas turbine engine may include that the inner diameter flow path is curved such that airflow passing through the inner diameter flow path is turned as it flows from the inner diameter flow aperture to an exit of the inner diameter flow path.

In addition to one or more of the features described above, or as an alternative, further embodiments of the gas turbine engine may include that the vane comprises a plurality of film cooling holes formed in a wall of the vane defining the leading-edge cavity.

In addition to one or more of the features described above, or as an alternative, further embodiments of the gas turbine engine may include that the film cooling holes are angled at an angle of 90° or greater relative to the direction of flow.

In addition to one or more of the features described above, or as an alternative, further embodiments of the gas turbine engine may include that the angle is 145° or greater.

In addition to one or more of the features described above, or as an alternative, further embodiments of the gas turbine engine may include that the baffle comprises a plurality of impingement holes arranged to direct an impingement flow at an internal surface of a wall of the vane that defines the leading-edge cavity.

In addition to one or more of the features described above, or as an alternative, further embodiments of the gas turbine engine may include that the vane comprises a plurality of thermal transfer augmentation features arranged on an internal surface of the vane defining the leading-edge cavity.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1A:
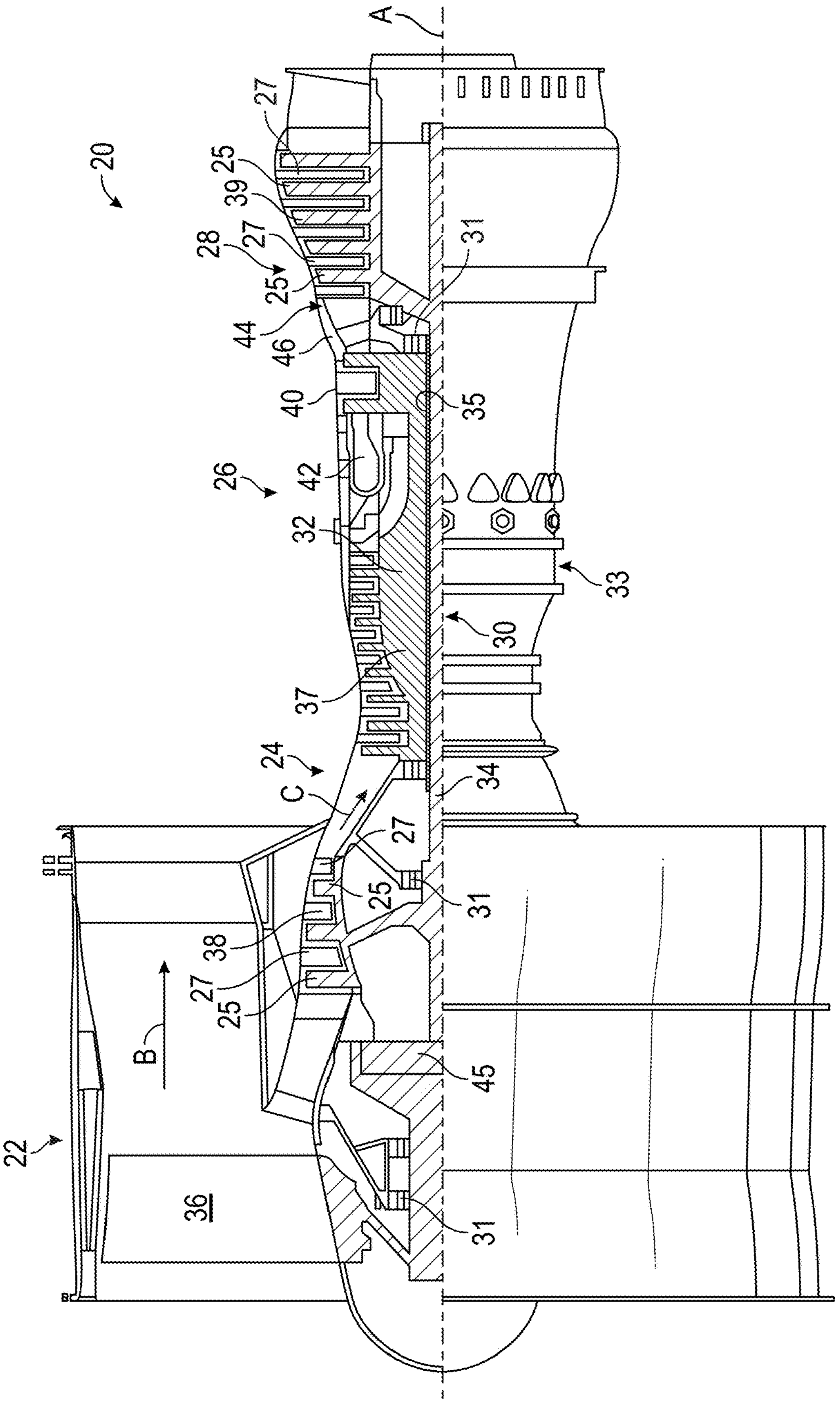
FIG. 1A is a schematic cross-sectional view of a gas turbine engine that may employ various embodiments disclosed herein.

FIG. 1A schematically illustrates a gas turbine engine 20. The exemplary gas turbine engine 20 is a two-spool turbofan engine that generally incorporates a fan section 22, a compressor section 24, a combustor section 26, and a turbine section 28. Alternative engines might include an augmenter section (not shown) among other systems for features. The fan section 22 drives air along a bypass flow path B, while the compressor section 24 drives air along a core flow path C (also referred to as "gaspath C") for compression and communication into the combustor section 26. Hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low-speed spool 30 and a high-speed spool 32 mounted for rotation about an engine centerline longitudinal axis A. The low-speed spool 30 and the high-speed spool 32 may be mounted relative to an engine static structure 33 via several bearing systems 31. It should be understood that other bearing systems 31 may alternatively or additionally be provided.

The low-speed spool 30 generally includes an inner shaft 34 that interconnects a fan 36, a low-pressure compressor 38 and a low-pressure turbine 39. The inner shaft 34 can be connected to the fan 36 through a geared architecture 45 to drive the fan 36 at a lower speed than the low-speed spool 30. The high-speed spool 32 includes an outer shaft 35 that interconnects a high-pressure compressor 37 and a high-pressure turbine 40. In this embodiment, the inner shaft 34 and the outer shaft 35 are supported at various axial locations by bearing systems 31 positioned within the engine static structure 33.

A combustor 42 is arranged between the high-pressure compressor 37 and the high-pressure turbine 40. A mid-turbine frame 44 may be arranged generally between the high-pressure turbine 40 and the low-pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low-pressure compressor 38 and the high-pressure compressor 37, is mixed with fuel and burned in the combustor 42, and is then expanded through the high-pressure turbine 40 and the low-pressure turbine 39. The high-pressure turbine 40 and the low-pressure turbine 39 rotationally drive the respective high-speed spool 32 and the low-speed spool 30 in response to the expansion.

The pressure ratio of the low-pressure turbine 39 can be pressure measured prior to the inlet of the low-pressure turbine 39 as related to the pressure at the outlet of the low-pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low-pressure compressor 38, and the low-pressure turbine 39 has a pressure ratio that is greater than about five (5:1). It should be understood, however, that the above parameters are only examples of one embodiment of a geared architecture engine and that the present disclosure is applicable to other gas turbine engines, including direct drive turbofans.

In this embodiment of the example gas turbine engine 20, a significant amount of thrust is provided by the bypass flow path B due to the high bypass ratio. The fan section 22 of the gas turbine engine 20 is designed for a particular flight condition-typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(T_{ram}° R)/(518.7° R)]^{0.5}$, where T represents the ambient temperature in degrees Rankine. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from the core airflow that is communicated through the gas turbine engine 20 along the core flow path C. The vanes 27 of the vane assemblies direct the core airflow to the blades 25 to either add or extract energy.

Various components of a gas turbine engine 20, including but not limited to the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling circuits for cooling the parts during engine operation.

Figure 1B:
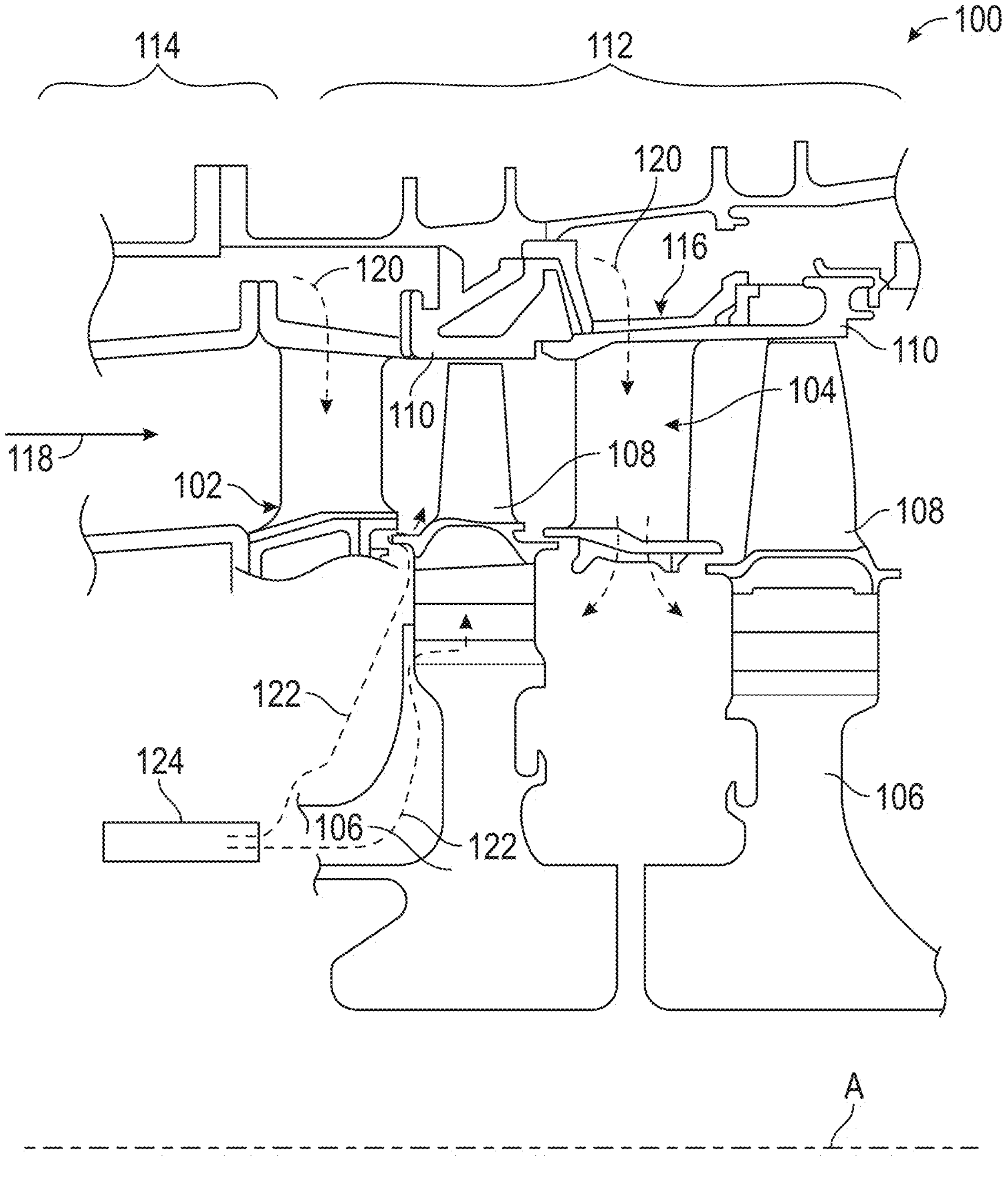
FIG. 1B is a partial schematic view of a turbine section of the gas turbine engine of FIG. 1A.

Referring now to FIG. 1B, a schematic illustration of an engine section 100 of a gas turbine engine that can incorporate embodiments of the present disclosure is shown. The engine section 100 shown in FIG. 1B may be illustrative of a portion of a turbine section arranged downstream of a combustor section of a gas turbine engine, such as shown and described above with respect to FIG. 1A. The engine section 100 includes a first stage vane 102 and a second stage vane 104. In this illustration, the first stage vane 102 is located forward of a first one of a pair of turbine disks 106. Each of the turbine disks 106 includes a plurality of turbine blades 108 secured thereto. The turbine blades 108 are configured to rotate proximate to blade outer air seals 110 at tips thereof. In this illustrative configuration, a blade outer air seal 110 is located aft of the first stage vane 102.

In one non-limiting example, the first stage vane 102 is the first vane of a high pressure turbine section 112 that is located aft of a combustor section 114 (see., e.g., FIG. 1A). The second stage vane 104 is located aft of the first stage vane 102 between the pair of turbine disks 106. The first stage vane 102 and the second stage vane 104 are located circumferentially about an engine central longitudinal axis A to provide or define a stator assembly 116. Hot gases from the combustor section 114 are configured to flow through the engine section 100 in a direction of arrow 118, thus the hot gases first interact with the first stage vane 102 and then subsequently with the second stage vane 104, in a flow path direction. Although a two-stage (e.g., two vane sections) system is illustrated, other engine sections/configurations are considered to be within the scope of various embodiments of the present disclosure.

Cooling may be required for both the vanes 102, 104 and the blades 108. As illustratively shown in FIG. 1B by the dashed-arrow lines, cooling flow 120 may be provided directly into each of the vanes 102, 104 at the outer diameter thereof. The downstream directional flow of the cooling flow 120 through the first stage vane 102 will be described in more detail herein. The cooling flow through the second stage vane 104 may pass radially inward through the second stage vane 104 and provide cooling to the turbine disks 106, as illustratively shown. Additional cooling flow 122 may be provided to the forward turbine disk 106 from a forward and radially inward location. Cooling air provided to the internal structures of the vanes 102, 104 and the blades 108.

For example, air is passed through various airfoil cavities of the airfoils (both vanes and blades) to provide cooling capacity to prevent overheating of the airfoils and/or other components or parts of the gas turbine engine. The cooling air for the forward blade 108 can be supplied from a tangential on-board injector ("TOBI") 124, as will be appreciated by those of skill in the art. A TOBI typically injects air from forward of a rotor, e.g., from proximate the combustor section 114 which is arranged forward of the turbine section 112. The TOBI can be configured to swirl secondary flow cooling air in the direction of the rotating direction of the rotor being cooled. Because of this, leakage from an inner diameter rim cavity can result from TOBI air is also inserted into the gaspath C at the same swirl direction as the rotating rotor.

Figure 2:
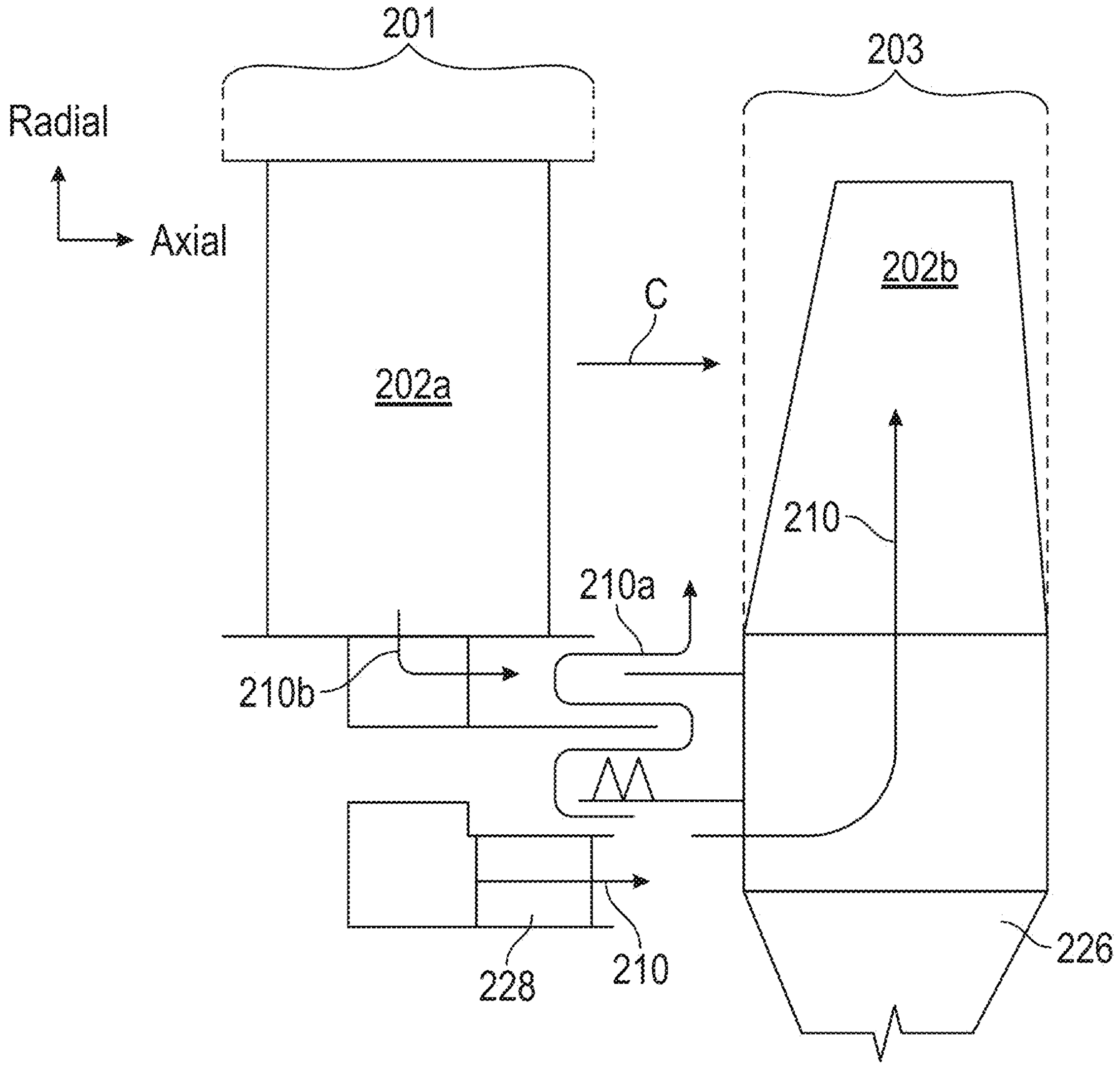
FIG. 2 is a side schematic illustration showing an assembly that may incorporate embodiments of the present disclosure, the assembly including a vane, a blade, and a cooling flow scheme associated therewith.

Referring now to FIG. 2, a schematic illustration of a forward positioned vane 202*a* relative to a rotating blade 202*b* is shown. The vane 202*a* may be part of a stator or vane section or assembly 201 and the blade 202*b* may be arranged on a rotating disc 226 of a rotating section or assembly 203 of a turbine of a gas turbine engine. As shown, the vane assembly 201 is arranged forward of the rotating assembly 203, and thus the blade 202*b* is aft of the vane 202*a*. The blade 202*b* rotates on the rotor disc 226 in a rotational direction (e.g., into the page of FIG. 2, or normal or tangential to the radial and axial directions). An aft-facing, forward located TOBI 228 is positioned forward of the disc 226 to direct a cooling airflow 210 toward the disc 226 and the blade 202*b*. A portion of the airflow of the cooling airflow path 210 may pass through the TOBI 228 and into the blade 202*b* and another portion may leak into a hot gaspath C as leakage flow 210*a*. Additionally, in this configuration, cooling flow 210*b* from the vane 202*a* may be used to both purge a rim cavity defined between the vane 202*a* and the blade 202*b* and, in some configurations, the cooling flow 210*b* may be directed to also cool the blade 202*b*.

As illustrated in FIG. 2, the leakage flow 210*a* may enter the hot gaspath C between the vane 202*a* and the blade 202*b*. The leakage flow 210*a*, because of the orientation of the TOBI 228, may enters the gaspath C in substantially the same direction as the direction of flow of the gaspath C and have an angle relative thereto due to the rotation of the disc 226. The TOBI 228 is oriented in this fashion such that the airflow leaving the TOBI 228 is in a direction of rotation of the disc. As such, the leakage flow 210*a* may be controlled to align cooling air from the TOBI 228 with the rotational direction of the disc 226. As will be appreciated by those of skill in the art, the vane 202*a* arranged within the gaspath C will turn (swirl) the gaspath air in the same direction of the rotating rotor. Likewise, the leakage flow 210*a* in front of the blade 202*b* that is swirled by the TOBI 228, enters the gaspath C in the same tangential flow direction. As such, when the two flows (gaspath C and leakage flow 210*a*) mix with each other at the inner diameter of the gaspath C, both flows are swirling in the same direction.

In the case that the vane is a first stage vane, meaning the first set of vanes arranged axially aft of a combustor section of a gas turbine engine, such vanes are conventionally impingement cooled. The impingement cooling may be provided from an interior structure, such as a baffle or the like, that receives a cooling flow and includes various impingement cooling holes to direct the cooling flow outward toward interior surfaces of a vane.

Figure 3A:
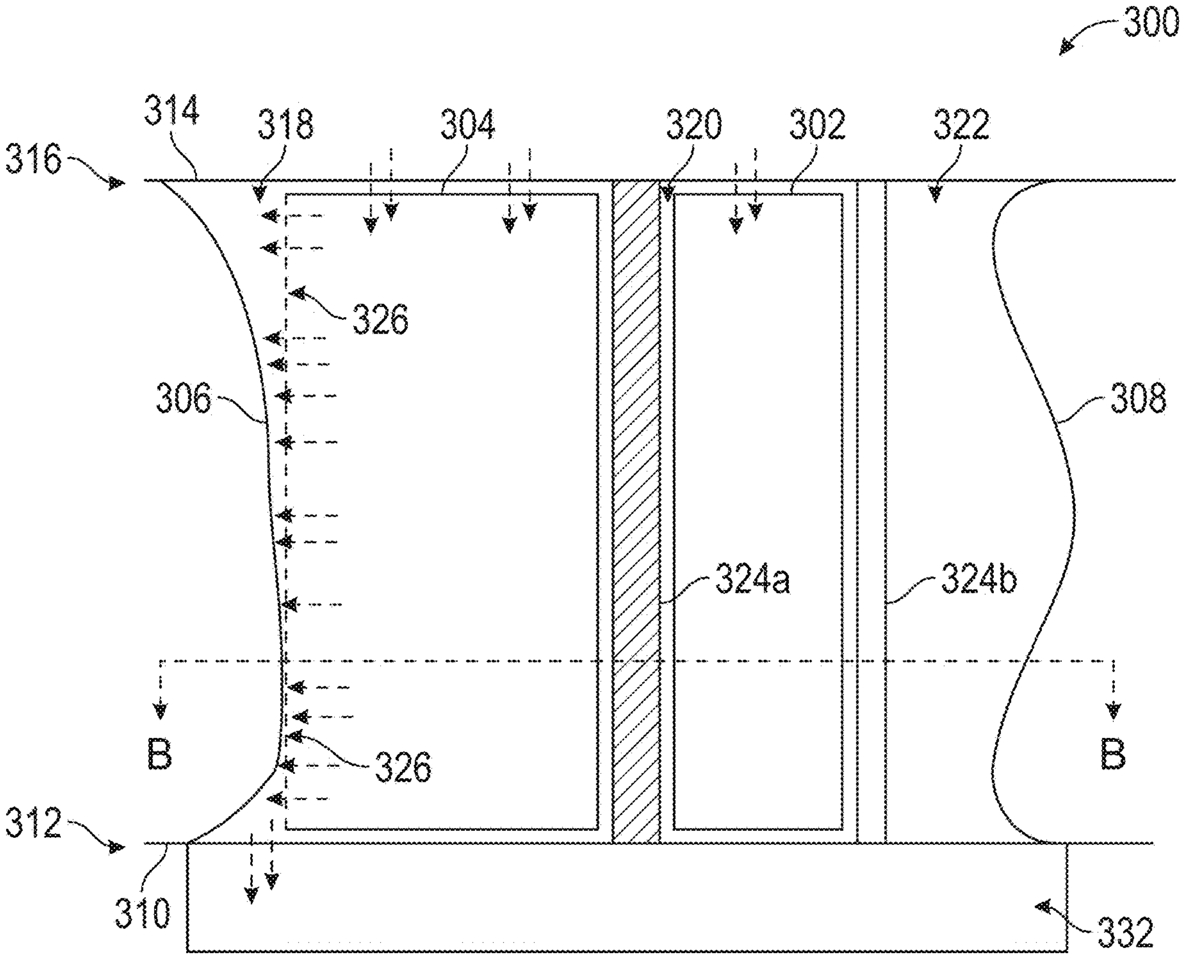
FIG. 3A is an elevation schematic illustration of a vane that may incorporate embodiments of the present disclosure.
Figure 3B:
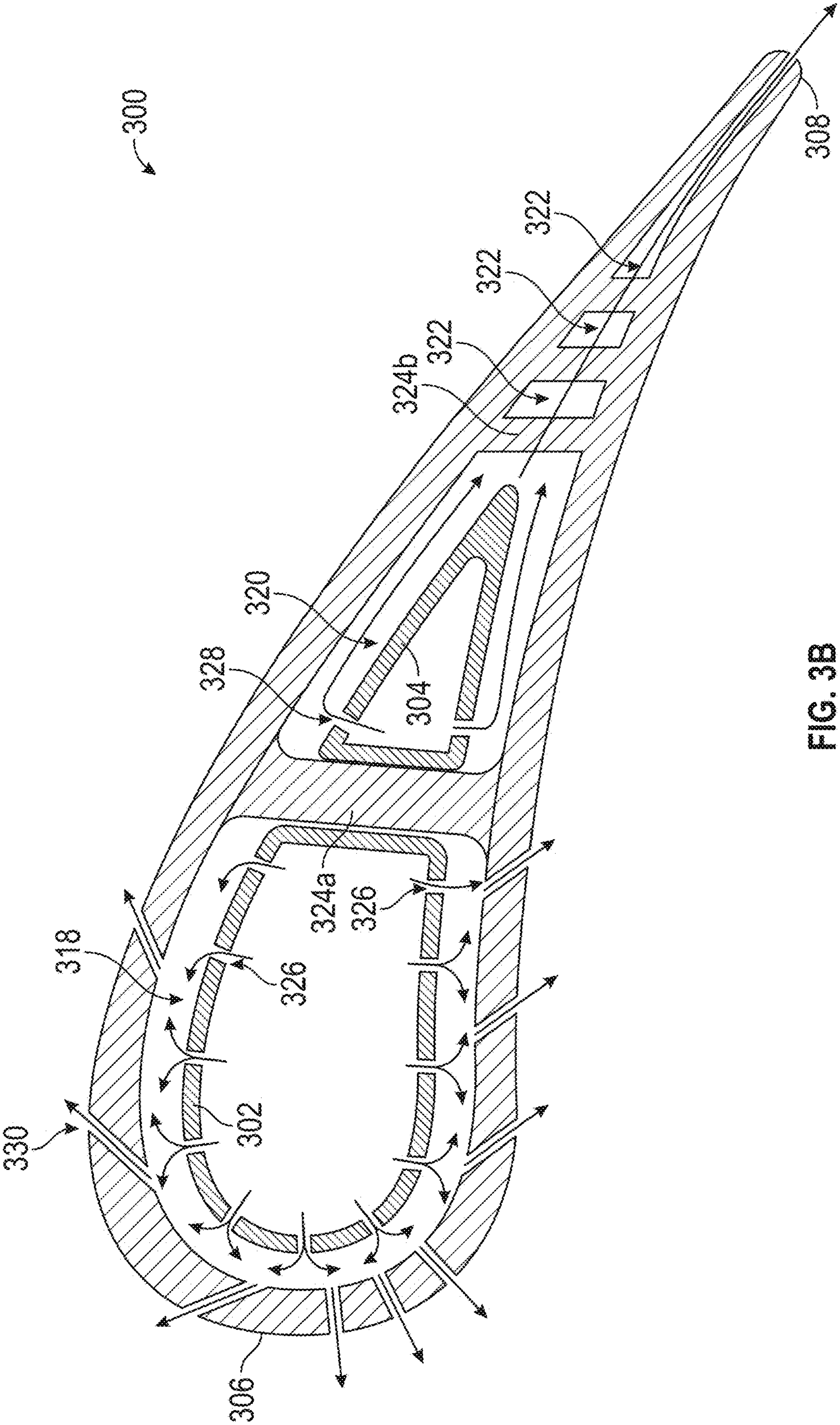
FIG. 3B is a cross-sectional illustration of the airfoil of FIG. 3A as viewed along the line B-B.

Turning now to FIGS. 3A-3B, schematic illustrations of a vane 300 having a first baffle 302 and a second baffle 304 installed therein are shown. Each baffle 302, 304 has a baffle body that defines the structure and shape of the respective baffle 302, 304. The vane 300 extends in an axial direction between a leading edge 306 and a trailing edge 308. In a radial direction, the vane 300 extends between an inner platform 310 at an inner diameter 312 and an outer platform 314 at an outer diameter 316. In this illustrative embodiment, the vane 300 has three internal cavities, illustrated with a leading-edge cavity 318, a midbody cavity 320, and a trailing edge cavity 322. Although shown with a specific cavity configuration, those of skill in the art will appreciate that airfoils can have a variety of internal cavity configurations (ranging from a single cavity to more than three cavities) and implement embodiments of the present disclosure. Thus, the present illustration is merely for explanatory purposes and is not to be limiting. FIG. 3A is a side elevation illustration of the vane 300 illustrating an internal structure thereof and FIG. 3B is a cross-sectional illustration as viewed along the line B-B labeled in FIG. 3A.

The cavities 318, 320, 322 may be separated by ribs 324*a*, 324*b*. The cavities 318, 320, 322 may be fluidly separate from each other or may be fluidly connected by one or more apertures or holes formed in the ribs 324*a*, 324*b*. The ribs 324*a*, 324*b* extend radially between the inner platform 310 at the inner diameter 312 to the outer platform 314 at the outer diameter 316. A first rib 324*a* may separate the midbody cavity 320 from the leading-edge cavity 318, and the first rib 324*a* may, in some embodiments, fluidly separate the two cavities 318, 320. A second rib 324*b* may separate the midbody cavity 320 from the trailing edge cavity 322, and may, in some embodiments, have through-holes to fluidly connect the midbody cavity 320 to the trailing edge cavity 322.

In this embodiment, the leading-edge cavity 318 includes the first baffle 302 installed therein and the midbody cavity 320 includes the second baffle 304 therein. The first baffle 302 includes first baffle holes 326 to supply cooling air from within the first baffle 302 into the leading-edge cavity 318. The cooling or impinged air may then exit the leading-edge cavity 318 through film cooling holes 330, as will be appreciated by those of skill in the art. The second baffle 304 includes second baffle holes 328 (FIG. 3B) where cooling air within the second baffle 304 may impinge upon surfaces of the vane 300 of the midbody cavity 320. The cooling air within the midbody cavity 320 may flow into the trailing edge cavity 322 and subsequently exit the vane 300 as known in the art.

The cooling flow that is passed into and through the baffles 302, 304 may be supplied from the outer diameter 316, such as through a vane outer diameter platform, and the cooling flow may travel radially inward (i.e., toward the inner diameter 312). As the cooling flow passes through the baffles 302, 304 it will flow out of the baffles 302, 304 through the first baffle holes 326 and the second baffle holes 328, and impinge upon the interior surfaces of the vane 300. The impingement air that enters the leading-edge cavity 318 will impinge upon the interior surfaces of the vane 300 that define leading-edge cavity 318 and remove heat therefrom. The air will then continue to travel radially inward along the surfaces of the vane 300 that define leading-edge cavity 318 and may enter an inner diameter vane cavity 332 (FIG. 3A). the inner diameter vane cavity 332 may receive the cooling flow and then direct such cooling air in an aftward direction toward a downstream disc, blade, and/or for purging into the hot gaspath, as described above. A TOBI or other structure may be provided at an outlet of the inner diameter vane cavity 332 to aid in control and directing of the cooling flow toward downstream components.

During operation, dirt, dust, and other particulate matter (generally referred to as particles or particulate matter) may be carried by the cooling flow, and such particles may stick to the interior surface of the vane, and thus build up. This sticking may be caused, in part, by the force of the impinging flow that exits the baffles. That is, relatively high-pressure air may be supplied into the baffles, and the air will leave the baffle through the various impingement holes and thus provide cooling to the interior surface of the vane. Because this cooling flow may carry such particles, the particles may collect at the areas of impingement. When sufficient build up occurs, the aggregated particulate matter may form a thermal barrier and effectively insulate the material of the vane and reduce the cooling effectiveness of the impingement cooling. Such hot spots may result in damage or part life reduction of the vane. In addition to forming hot spots by deposition, another impact of particulate matter being carried by the cooling impingement flow is plugging of the film holes on the exterior of the vane. That is, particles may become lodged within one or more of the film cooling holes, thus reducing the film cooling effectiveness and/or generating hot spots similar to the build up described above.

In view of the above, embodiments of the present disclosure are directed to improved cooling schemes and particulate matter removal. For example, in accordance with some non-limiting embodiments, cooling is provided to the vane and a large percentage of the cooling flow and thus and carried particulate matter is directed to a purge cavity between the static vanes and blades of a downstream rotating disc (e.g., as shown in FIG. 2. The particulate matter will travel with the momentum of the cooling flow path. Accordingly, an intentional throughflow of air traveling from the outer diameter toward the inner diameter may be provided to ensure sufficient velocity in the space between the baffle and the surface of the vane may carry any particulates radially inward into the inner diameter vane cavity and may be purged into the hot gas path. Furthermore, in some embodiments, the film cooling holes may be orientated in such a manner to reduce clogging by particulate matter. For example, the film cooling holes may be oriented to be greater than 90 degrees from a radially inward flow direction. As such, the particulate matter will tend to stay with the main cooling flow and not deposit on the interior surface of the vane and/or within the film cooling holes.

Figure 4A:
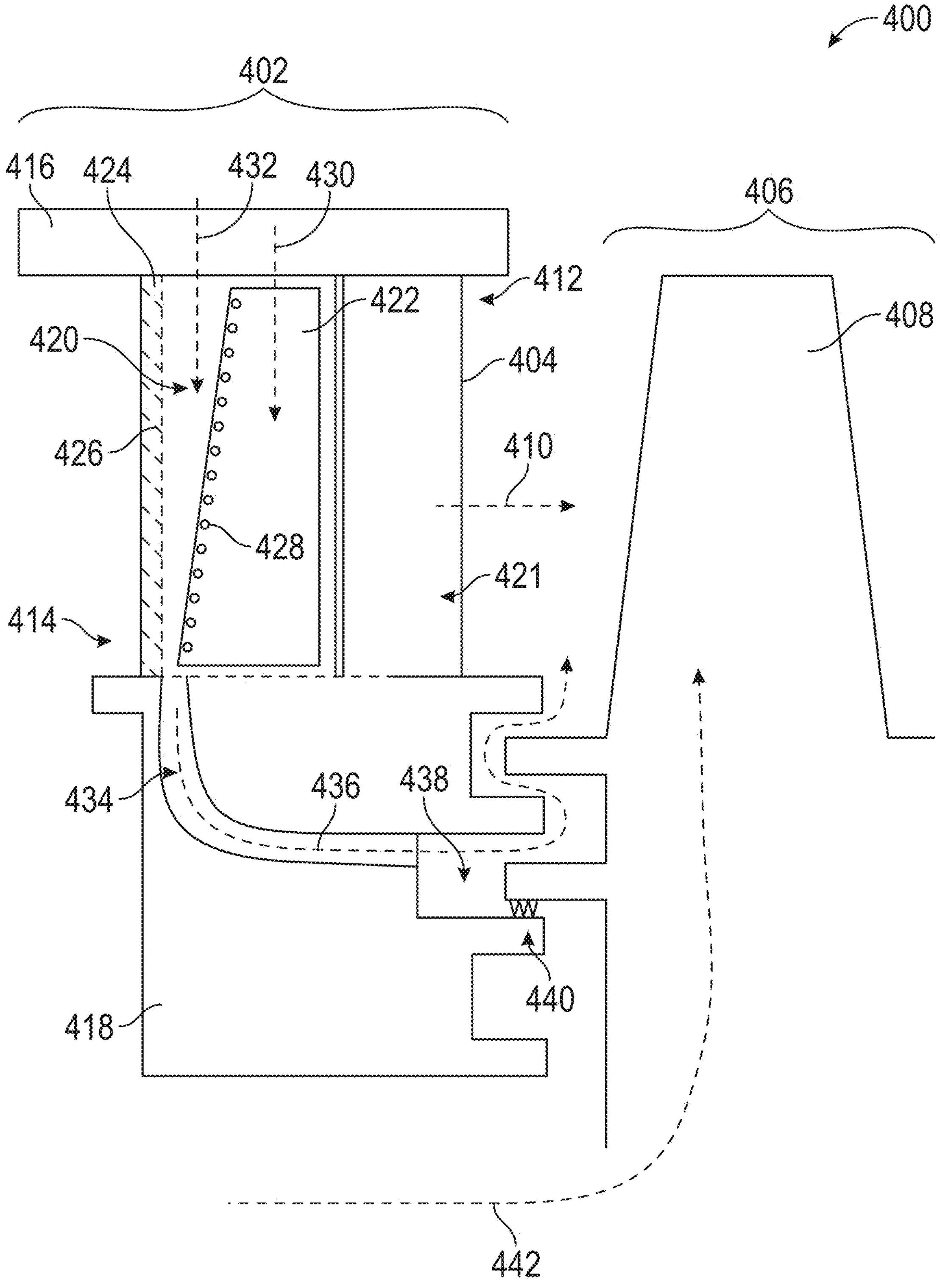
FIG. 4A is a schematic illustration of a portion of a turbine assembly in accordance with an embodiment of the present disclosure.
Figure 4B:
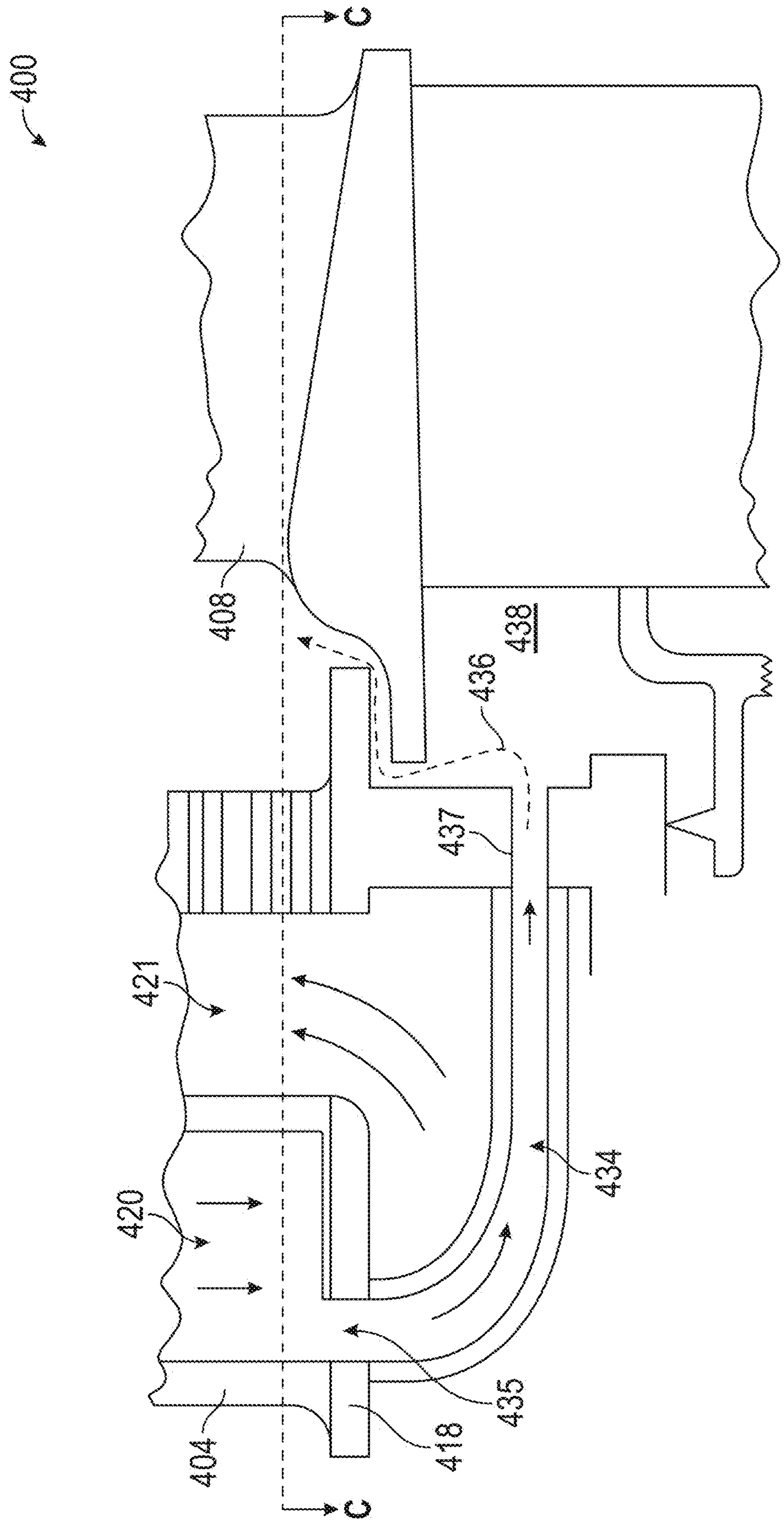
FIG. 4B is an enlarged illustration of a portion of the turbine assembly shown in FIG. 4A.
Figure 4C:
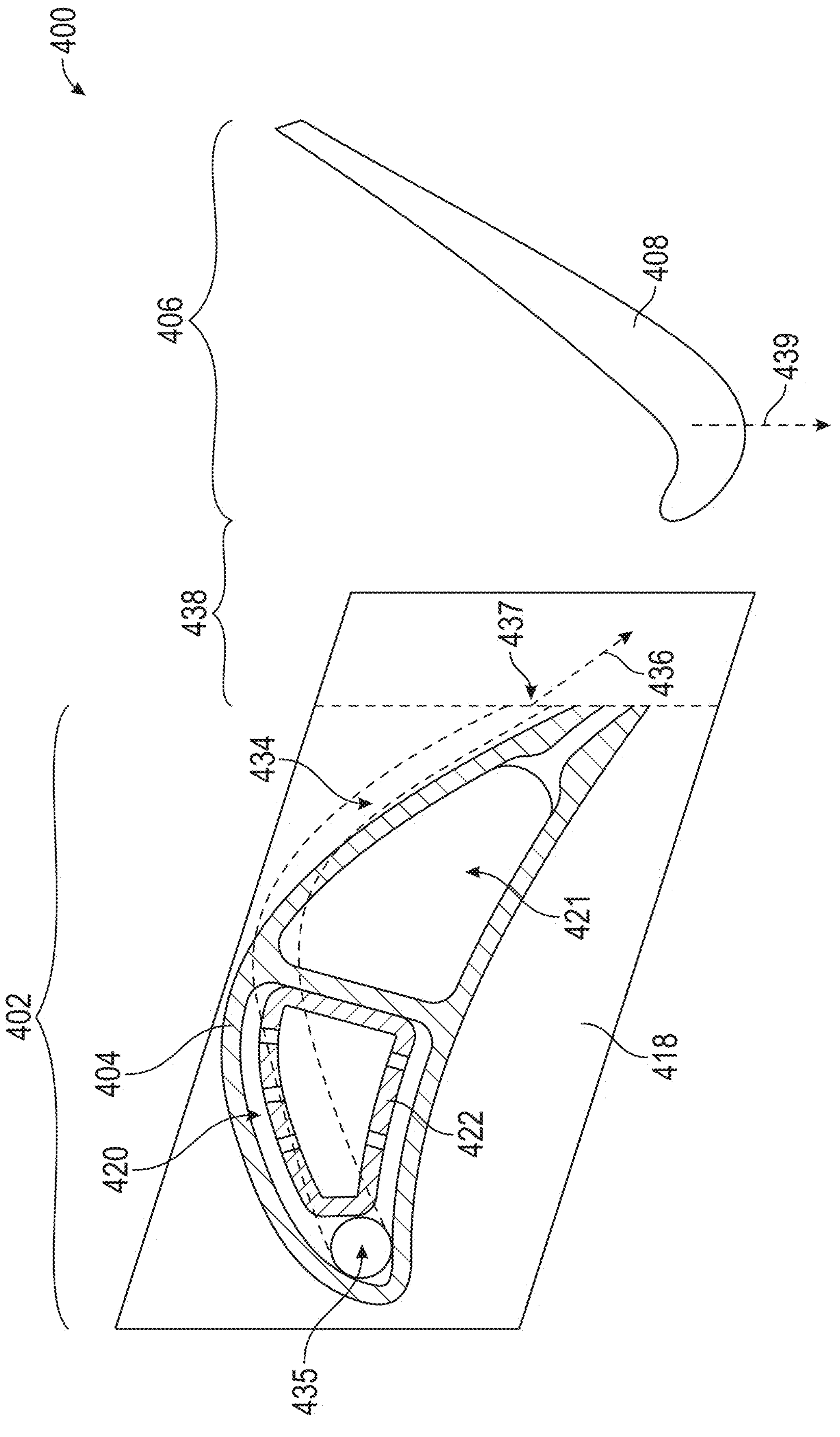
FIG. 4C is a partial cross-sectional view, looking radially inward, of the turbine assembly as indicated by the line C-C in FIG. 4B.

Referring now to FIGS. 4A-4C, schematic illustrations of a portion of a turbine section 400 in accordance with a non-limiting embodiment of the present disclosure is shown. FIG. 4A is a schematic illustration of the turbine section 400, FIG. 4B is an enlarged illustration of an inner diameter of a vane assembly 402 of the turbine section 400, and FIG. 4C is a partial cross-sectional illustration of the turbine section 400 as viewed along the line C-C shown in FIG. 4B.

The turbine section 400 includes the vane assembly 402 having one or more vanes 404 and a rotor assembly 406 having one or more blades 408. The turbine section 400 may be configured as part of a gas turbine engine, such as shown and described above. The vane assembly 402 may be a first vane assembly, and thus may be subject to high temperature combustion gases that are expelled from an upstream combustor section of the engine. The vane assembly 402 may be configured to direct a flow of hot air in a hot gas path 410 toward the rotor assembly 406 and the rotor assembly 406 may be rotated, as will be appreciated by those of skill in the art.

The vane assembly 402 includes at least one vane 404 that extends in a radial direction between an outer diameter 412 and an inner diameter 414. The vane 404 may be configured similar to that shown and described above, having internal cooling channels, cavities, and/or features. The vane 404 extends between and is supported by an outer diameter platform 416 and an inner diameter platform 418. In this configuration, the vane 404 includes a leading-edge cavity 420 with a baffle 422 installed therein and an aft cavity 421. Along a leading edge 424 of the vane 404 is a set of film cooling holes 426. The baffle 422 includes a set of impingement holes 428. The impingement holes 428 are configured to direct a cooling air onto interior surfaces of the leading edge 424 and the film cooling holes 426 are configured to bleed a portion of the cooling air to the exterior of the leading edge 424 to form a film of cool air on an exterior surface of the leading edge 424.

As illustratively shown, the vane 404 may be supplied with impingement cooling air 430 that is supplied into the baffle 422. Additionally, a throughflow 432 may be directed into the leading-edge cavity 420 in the space between the baffle 422 and the interior surfaces of the vane 404. In operation, the impingement cooling air 430 will enter the baffle 422 and expel outward through the impingement holes 428 and impinge upon the interior surface of the leading edge 424. A radially inward end of the baffle 422 may be solid or closed off, such that the impingement cooling air 430 exits the baffle 422 through the impingement holes 428. After the impingement air impacts and removes heat from the leading edge 424 and/or other surfaces of the vane 404, a portion of the impingement air will flow out of the vane 404 through the film cooling holes 426, and a portion of the impingement air will mix with the throughflow 432 and will be forced radially inward through the vane 404 to an inner diameter flow path 434. To ensure appropriate flow velocities through the leading-edge cavity 420, the baffle 422 may be configured to have an increasing size such that the leading-edge cavity 420 narrows from the outer diameter 412 to the inner diameter 414. In some embodiments, a supply of the cooling flow for both the impingement cooling air 430 and the throughflow 432 may be the same source. In other embodiments, the source or supply of flow to the impingement cooling air 430 and the throughflow 432 may be different sources. In some embodiments, a supply of the cooling may be only the throughflow 432, without impingement on the internal convex and/or concave surfaces of the vane 404.

The mixed flow 436 (e.g., the combination of the impingement cooling air 430 and the throughflow 432) will enter the inner diameter flow path 434 through an inlet 435 and then be fed into a rotor cavity 438 through an outlet 437. The inner diameter flow path 434 may be configured as a tangential onboard injector (TOBI) for cooling portions of the blade 408 of the rotor section 406, such as a forward, inner diameter blade platform or the like. As such, the mixed flow 436 may be configured to be turned within the inner diameter flow path 434, as shown in FIG. 4C. The direction the mixed flow 436 is turned is such that it flows in a direction of rotation 439 of the rotor section 406. The mixed flow 436 will then flow radially outward and re-enter and mix with the air of the hot gas path 410. As such, the rotor cavity 438 may be purged by the mixed flow 436 that is used to cool the vane 404. The mixed flow 436 may be substantially prevented from traveling further radially inward by one or more seals 440. The blades 408 of the rotor section 406 may be cooled by a separate rotor cooling flow 442 that is provided to an inner diameter platform of the blades 408, as will be appreciated by those of skill in the art.

Advantageously, the present cooling scheme not only provides for a cooling mechanism for the vanes 404, which may be first vanes of a high-pressure turbine section, but also provides for a mechanism for preventing build up of particulate matter within the vane 404. As noted above, particulate matter may be carried by various cooling flows, such as within the impingement cooling air 430 and the throughflow 432. The particulate matter may build up or accumulate on the interior surface of vane 404 and/or may plug the film cooling holes 426, resulting in reduced cooling, potential hot spots, and eventually may result in part failure. However, because of the flow through the vane 404, using both the impingement cooling air 430 and the throughflow 432, particulate matter may be carried by such flowing air and be carried into and through the inner diameter flow path 434. The mixed flow 436, which will carry the particulate matter, will be directed into the rotor cavity 438 and then purge such particulate matter into the hot gas path 410. This purging of the particulate matter from the rotor cavity 438 may be achieved without increase a pressure ratio of cooling air being used to cool the vane 404. That is, using existing pressure schemes (e.g., flow pressures, flow rates, cool air sources, etc.), a purging property may be achieved through embodiments of the present disclosure without additional work or energy input to the system.

The use of the throughflow 432 causes the impingement cooling air 430 to turn radially inward, after impinging upon the inner or interior surfaces of the vane 404. As such, no stagnation of such flow should occur, and particulate matter carried by the impingement cooling air 430 will be directed radially inward, at least in part, by the throughflow 432. Additionally, due to the structural arrangement of the baffle 422, the flow may be ensured to keep a desired flow rate and pressure. That is, as the leading-edge cavity 420 extends radially inward from the outer diameter 412 toward the inner diameter 414, the leading-edge cavity 420 will taper and occupy less cross-sectional area in a flow direction (i.e., radially inward). As the cross-sectional area of the leading-edge cavity 420 reduces due to the increase in space occupied by the baffle 422 (i.e., space-eater baffle), the mixed air will accelerate and thus carry any particulate matter out of the vane 404 and into the inner diameter flow path 434. As noted above, in some non-limiting embodiments, the vanes of the present disclosure may be configured with fully throughflow arrangements (e.g., no impingement) or may be configured with various combinations (e.g., amounts) of impingement as compared to throughflow.

As shown in FIGS. 4B-4C, in accordance with some embodiments of the present disclosure, a downstream end of the inner diameter flow path 434 may be tapered or narrowing in dimension. Such a tapering of the inner diameter flow path 434 may result in an acceleration of the mixed flow 436 as it exits the inner diameter flow path 434 and enters the rotor cavity 438. Accordingly, in some configurations, the cross-sectional area of the inner diameter flow path 434 may be reduced causing an acceleration of the mixed flow 436. Additionally, as shown, the inner diameter flow path 434 may have an arcuate or curved flow path through the inner diameter platform 418, which may substantially mimic the airfoil shape of the vane 404. In other configurations, the inner diameter flow path 434 may have a substantially straight configuration or orientation, without departing from the scope of the present disclosure.

Referring now to FIGS. 5A-5D, schematic illustrations of a portion of a vane assembly 500 in accordance with an embodiment of the present disclosure are shown. The vane assembly 500 includes a vane 502 similar to that shown and described above. The illustration of FIGS. 5A-5D is representative of a leading-edge portion of a vane, and aft portions thereof are not illustrated for simplicity. The vane 502 extends radially inward from an outer diameter platform 504 at an outer diameter 506 to an inner diameter platform 508 at an inner diameter 510. The vane 502 includes a leading-edge cavity 512, and may include other cavities or internal cooling configurations, as will be appreciated by those of skill in the art. The leading-edge cavity 512 is a throughflow cavity such that cooling air introduced at the outer diameter 506 will flow radially inward and through the leading-edge cavity 512 and exit through an inner diameter flow aperture 514, which may be fluidly coupled to an inner diameter flow path, such as shown in FIG. 4.

The leading-edge cavity 512 is defined between interior surfaces of a leading edge 516 of the vane 502 and exterior surfaces of a baffle 518 installed within the vane 502. It will be appreciated that the leading-edge cavity 512 is also defined, in part, by pressure and suction side extensions of the vane 502 as the vane extends aftward toward a trailing edge of the vane 502, and thus the leading-edge cavity 512 may have an axial dimension that extends aftward from the leading edge 516 of the vane 502. To provide cooling to the vane 502, and specifically the interior or internal surfaces of the leading-edge cavity 512, the vane 502 has the baffle 518 installed therein. The baffle 518 includes a plurality of impingement holes 520 that are sourced cooling air from within the baffle 518, which may be supplied from an outer diameter end of the baffle 518. The impingement air will flow out of the impingement holes 520 and impinge upon the interior surface of the vane 502 and convectively cool the vane 502.

The vane 502 may also include optional thermal transfer augmentation features 522 on the interior surface thereof. The thermal transfer augmentation features 522 may be trip strips, deptowarts, chevron strips, or the like, as will be appreciated by those of skill in the art. The thermal transfer augmentation features 522 may be configured to increase a convective cooling process and improve thermal pickup by the cool air within the leading-edge cavity 512. In some configurations, the baffle 518 may include similar or complementary thermal transfer augmentation features on an exterior surface thereof (i.e., within the leading-edge cavity 512), although not shown for simplicity.

Furthermore, the vane 502 may include film cooling holes 524 fluidly connecting the leading-edge cavity 512 to the exterior of the vane 502. The film cooling holes 524 allow for a portion of the cooling air within the leading-edge cavity 512 to flow through the exterior wall of the vane 502 and form a film on an exterior surface of the vane 502. The air passing through the film cooling holes 524 may be sourced from the baffle 518 (i.e., from the impingement holes 520) and/or from a throughflow supplied at the outer diameter 506 of the vane 502 and directly into the leading-edge cavity 512.

Figure 5A:
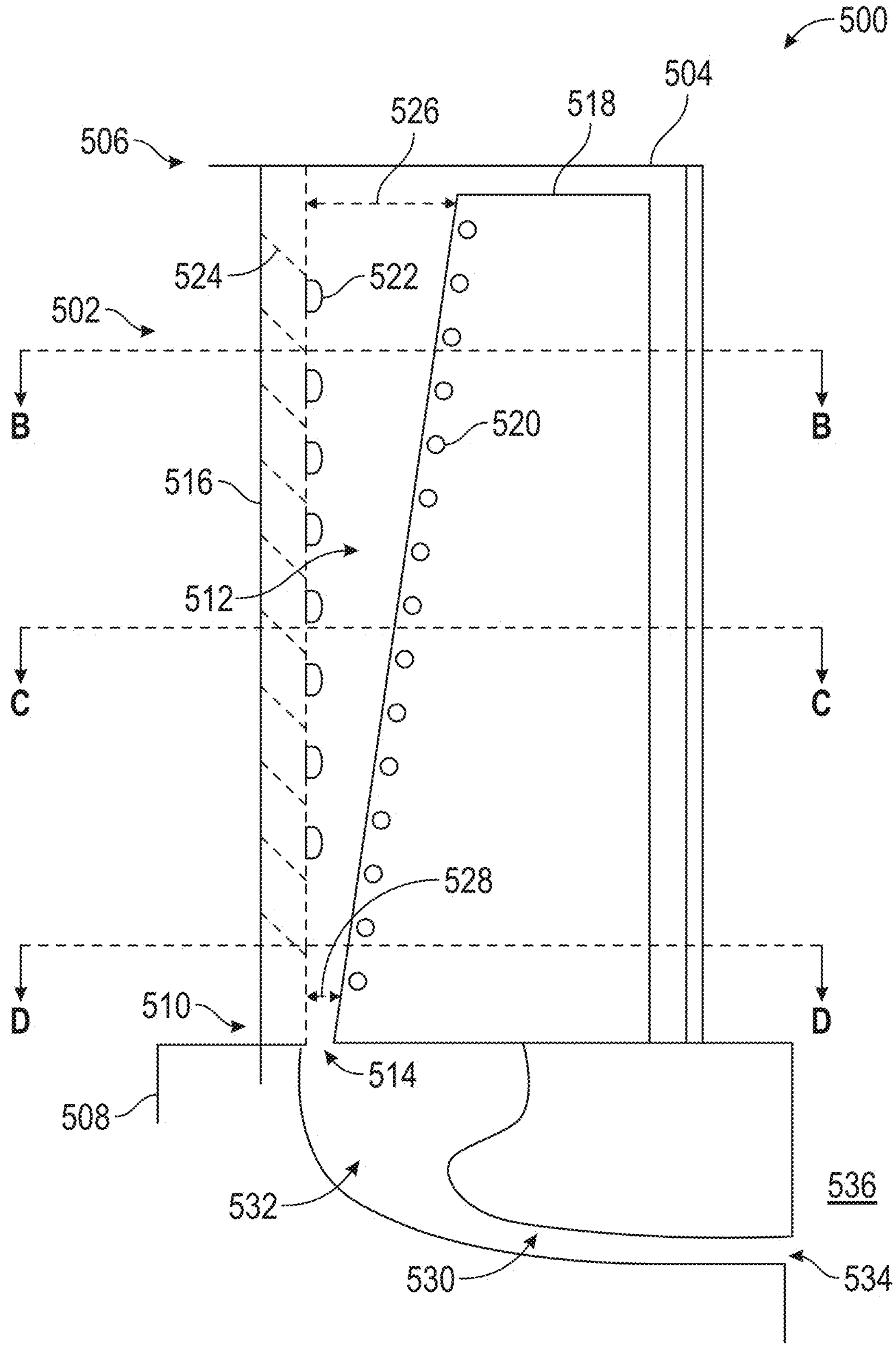
FIG. 5A is a side elevation view of a vane assembly in accordance with an embodiment of the present disclosure.
Figure 5B:
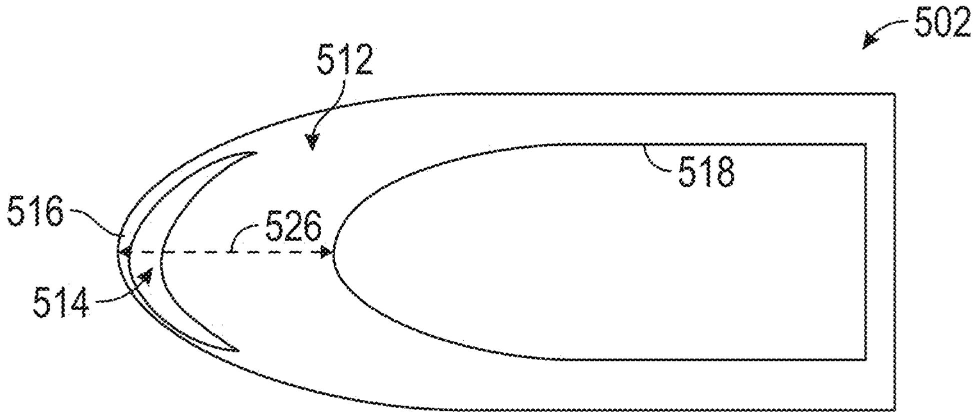
FIG. 5B is a cross-sectional view of a vane of the vane assembly of FIG. 5A viewed along the line B-B of FIG. 5A.
Figure 5C:
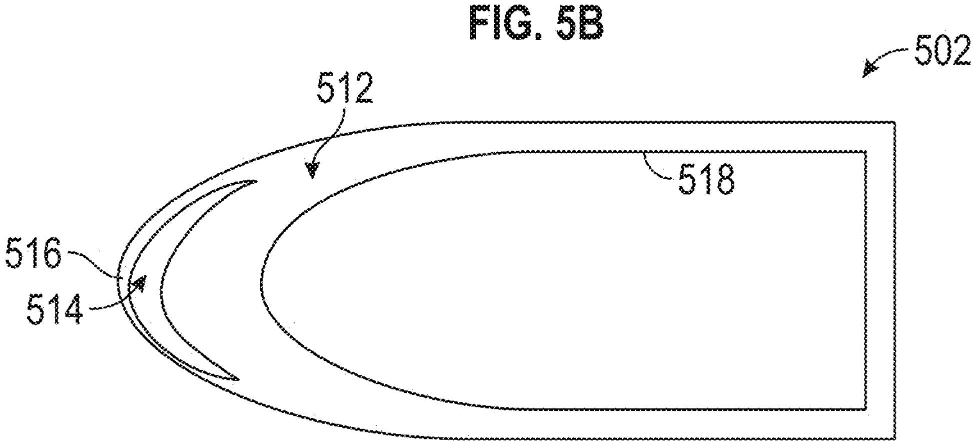
FIG. 5C is a cross-sectional view of a vane of the vane assembly of FIG. 5A viewed along the line C-C of FIG. 5A.
Figure 5D:
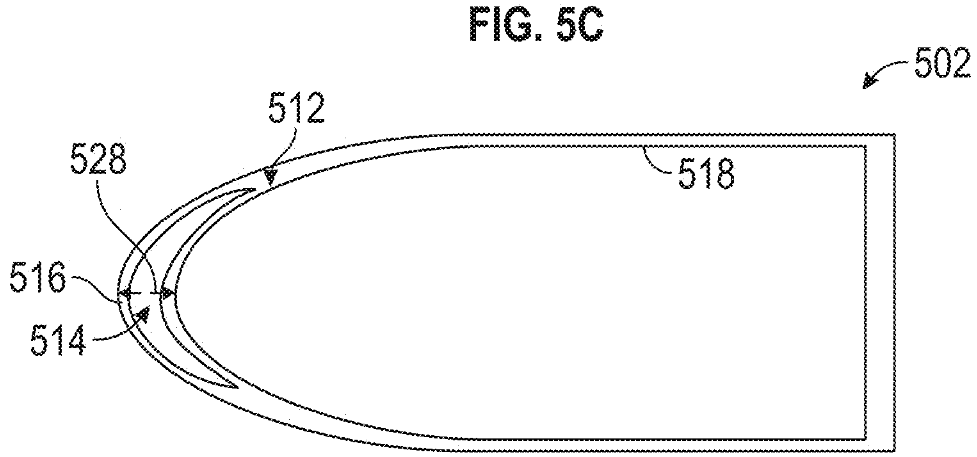
FIG. 5D is a cross-sectional view of a vane of the vane assembly of FIG. 5A viewed along the line D-D of FIG. 5A.

As shown, the leading-edge cavity 512 narrows in the direction from the outer diameter 506 toward the inner diameter 510. The narrowing, shown more clearly in the cross-sectional views of FIGS. 5B-5D, is achieved due to the configuration of the baffle 518. For example, at the outer diameter end of the baffle 518, the cross-sectional area of the leading-edge cavity 512 is larger than the cross-sectional area of the leading-edge cavity 512 at the inner diameter end of the baffle 518. That is, the baffle 518 increases in cross-sectional area in a radially inward direction which causes the leading-edge cavity to narrow and decrease in cross-sectional area (in a flow direction or radially inward direction). For example, at the outer diameter end of the baffle 512, the leading-edge cavity 512 may be defined as a maximum flow space 526 and at the inner diameter end of the baffle 512 a minimum flow space 528 is defined. As the leading-edge cavity 512 narrows, the flow velocity of the air passing through the leading-edge cavity 512 will be maintained at sufficient levels to prevent stagnation of the flow. For example, the relationship between the radial flow area and the gaps (e.g., flow spaces 526, 528) is substantially equal to a constant as the radial position changes. As such, if 10% of total flow exits the end of the cooling (e.g., at the minimum flow space 528), and all cooling air is sourced from the outer diameter platform 504, then the area at the outlet (inner diameter) would be 10% of the area at the inlet (outer diameter). That is, a relatively constant radial flow rate to flow area relationship is maintained throughout the radial length of the leading-edge cavity 512.

The tapering or narrowing of the leading-edge cavity 512 may be a smooth transition from the outer diameter 506 to the inner diameter 510. To provide such narrowing, the baffle 518 has an increasing cross-sectional area and amount of the leading-edge cavity 512 that is occupied thereby.

At the inner diameter 510, the vane 502 includes the inner diameter flow aperture 514. The inner diameter flow aperture 514 fluidly couples to an inner diameter flow path 530. As such, the inner diameter flow aperture 514 may also be referred to as an inlet to the inner diameter flow path 530. Arranged within the inner diameter platform 508 may be a purge manifold 532. The purge manifold 532 may be a space arranged within the inner diameter platform 508 and may fluidly connect to one or more different vanes of a vane assembly. That is, multiple different, adjacent vanes may be fluidly coupled to the purge manifold 532 which receives the cooling air from the connected vanes and any particulate matter carried thereon. Similar to the relationship of the inner and outer diameter flow areas within with the vane 502, the purge manifold 532 may be sized, shaped, orientated, or otherwise configured to ensure that the desired flow rates and volumes are maintained. That is, the purge manifold 532 may be designed to ensure constant flow rate through the vane 502. The air, potentially carrying particulate matter, may then flow through the inner diameter flow path 530 in the inner diameter platform 508 and exit through an exit 534 that turns and directs the flow into and through a rotor cavity 536. As such, any debris or particulate matter within the flow that is supplied to the vane 502 may be purged and carried out of the vane 502, and subsequently redirected into the hot gas path stream, as described above.

Figure 6:
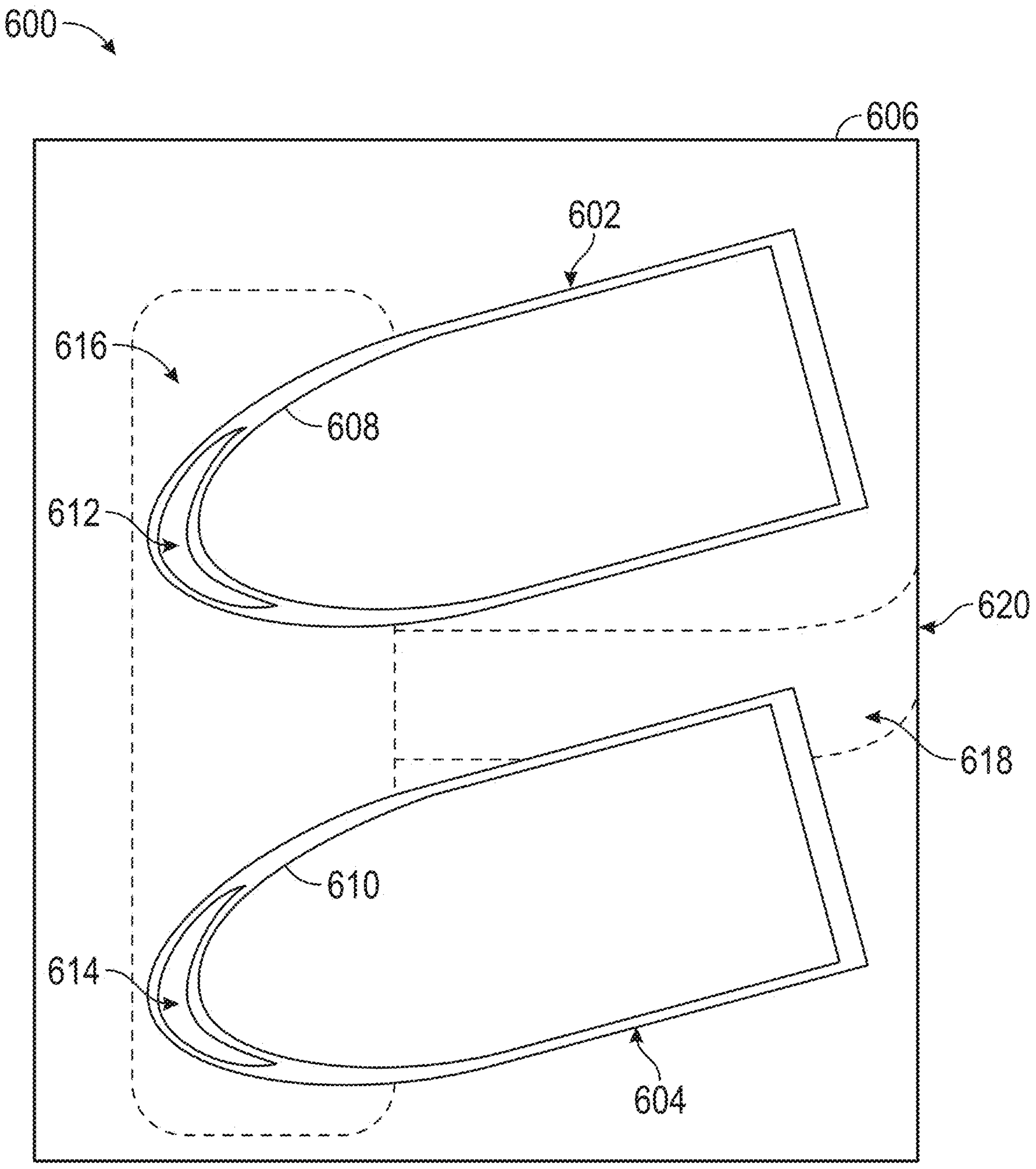
FIG. 6 is a schematic illustration of a portion of a vane assembly in accordance with an embodiment of the present disclosure.

Referring now to FIG. 6, a schematic illustration of a vane assembly 600 in accordance with an embodiment of the present disclosure is shown. The vane assembly 600 includes a first vane 602 and a second vane 604. In this view, an inner diameter platform 606 is illustrated, and the view is in a radially inward direction. An outer diameter platform is not shown for clarity. The two vanes 602, 604 are attached to or integrally formed with the inner diameter platform 606. The vanes 602, 604 may be configured similar to that shown and described above, having a baffle 608, 610 installed within the vanes 602, 604 and an inner diameter flow aperture 612, 614 arranged as described above. The inner diameter flow apertures 612, 614 fluid connect a cavity of the vanes 602, 604 with a purge manifold 616 that is defined within the inner diameter platform 606. The purge manifold 616 is fluidly coupled to the interior of both vanes 602, 604 and receives a cooling flow from each of the vanes 602, 604 through the respective inner diameter flow apertures 612, 614.

Cooling air within the purge manifold 616 may include particulate matter carried thereon. The cooling flow may then enter an inner diameter flow path 618 which is configured to turn and direct the flow in a direction of rotation of a rotor disc that is arranged aft of the vane assembly 600. The inner diameter flow path 618 includes an outlet 620 that opens into a rotor cavity that is defined between an aft end of the vane assembly 600 and a rotor disc arranged axially adjacent the vane assembly 600 (e.g., along an axis of an engine). In this configuration, the two vanes 602, 604 share the common purge cavity 616. In other embodiments, each vane may have a dedicated purge cavity and associated inner diameter flow path. In other embodiments, more than two vanes may share the same purge cavity (e.g., three, four, five, six, etc.). In still other embodiments, if a vane assembly has multiple vanes, the vanes of the assembly may be grouped with multiple shared purge cavities. For example, in a vane assembly having six (6) total vanes, each vane may have a separate purge cavity (i.e., six purge cavities), pairs of two vanes may share a common purge cavity (i.e., three purge cavities), groups of three vanes may share a common purge cavity (i.e., two purge cavities), a single purge cavity may be used for all six vanes, or some combination such as a group of four vanes may share a first common purge cavity and a group of two vanes may share a second common purge cavity. As such, the illustrative configuration is not intended to be limiting, but rather for illustrative and explanatory purposes. Furthermore, it is noted that the geometric shape of the vanes 602, 604 in FIG. 6 is merely representative, and the vanes can include structures aft of the illustrative configuration (e.g., serpentine cavities, aft cavities, a tapering trailing edge, etc.), and the geometric illustration shown in FIG. 6 is not intended to be limiting.

Figure 7:
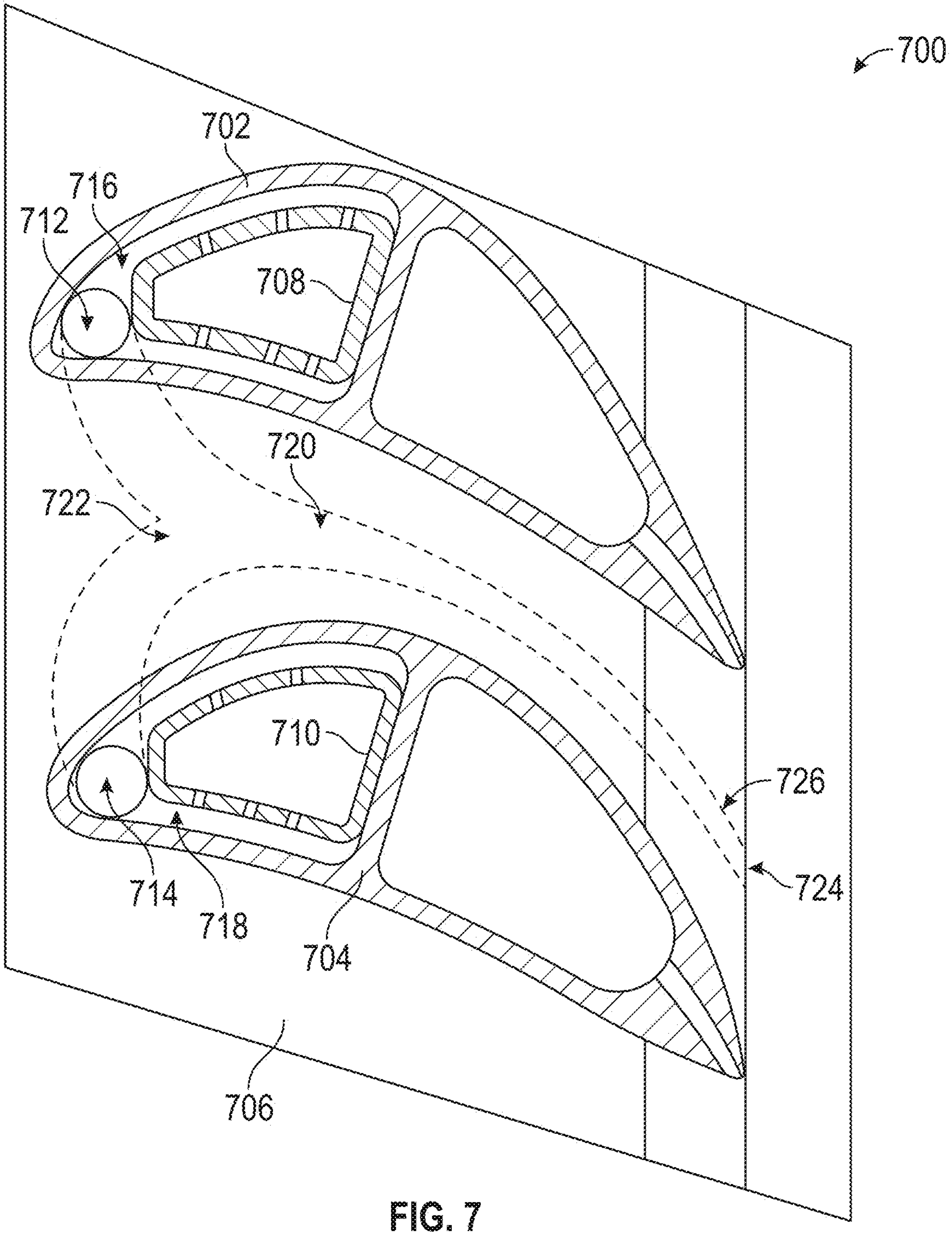
FIG. 7 is a schematic illustration of a portion of a vane assembly in accordance with another embodiment of the present disclosure.

Referring now to FIG. 7, a schematic illustration of a vane assembly 700 in accordance with an embodiment of the present disclosure is shown. The vane assembly 700 includes a first vane 702 and a second vane 704. In this view, an inner diameter platform 706 is illustrated, and the view is in a radially inward direction. An outer diameter platform is not shown for clarity. The two vanes 702, 704 are attached to or integrally formed with the inner diameter platform 706. The vanes 702, 704 may be configured similar to that shown and described above, each having a respective baffle 708, 710 installed within the vanes 702, 704 and an inner diameter flow aperture 712, 714 arranged as described above. The inner diameter flow apertures 712, 714 fluid connect a respective leading edge cavity 716, 718 of the vanes 702, 704 with an inner diameter flow path 720 that is defined within the inner diameter platform 706. The inner diameter flow path 720 is fluidly coupled to the interior of both vanes 702, 704 and receives a cooling flow from each of the vanes 702, 704 through the respective inner diameter flow apertures 712, 714. As such, the inner diameter flow apertures 712, 714 may also be referred to as inlets to the inner diameter flow path 720. In some configurations, the inner diameter flow path 720 may include a purge manifold 722 or the like, as shown and described above, for mixing of the flows from the two vanes 702, 704.

Cooling air within the inner diameter flow path 720 may include particulate matter carried thereon. The cooling flow may be mixed within the purge manifold 722 and enter the inner diameter flow path 720 which is configured to turn and direct the flow in a direction of rotation of a rotor disc that is arranged aft of the vane assembly 700. The inner diameter flow path 720 includes an outlet 724 that opens into a rotor cavity that is defined between an aft end of the vane assembly 700 and a rotor disc arranged axially adjacent the vane assembly 700 (e.g., along an axis of an engine) and as shown and described above. In this configuration, the two vanes 702, 704 share the purge manifold 722 and inner diameter flow path 720 for mixing and directing the flow toward the outlet 724. In other embodiments, each vane may have a dedicated purge cavity and associated inner diameter flow path. In other embodiments, more than two vanes may share the same purge cavity (e.g., three, four, five, six, etc.). In still other embodiments, if a vane assembly has multiple vanes, the vanes of the assembly may be grouped with multiple shared purge cavities. For example, in a vane assembly having six (6) total vanes, each vane may have a separate purge cavity (i.e., six purge cavities), pairs of two vanes may share a common purge cavity (i.e., three purge cavities), groups of three vanes may share a common purge cavity (i.e., two purge cavities), a single purge cavity may be used for all six vanes, or some combination such as a group of four vanes may share a first common purge cavity and a group of two vanes may share a second common purge cavity. As such, the illustrative configuration is not intended to be limiting, but rather for illustrative and explanatory purposes. Furthermore, it is noted that the geometric shape of the vanes 702, 704 in FIG. 7 is merely representative, and the vanes can include structures aft of the illustrative configuration (e.g., serpentine cavities, aft cavities, a tapering trailing edge, etc.), and the geometric illustration shown in FIG. 7 is not intended to be limiting.

In this configuration, the inner diameter flow path 720 includes a tapering portion 726 proximate the outlet 724. As such, the cross-sectional area of the inner diameter flow path 720 may decrease as the flow travels axially aft toward the outlet 724. This tapering portion 726 will cause the air within the inner diameter flow path 720 to accelerate as it is directed into the rotor cavity, and may be in a direction of rotation of a disk of the rotor located aft of the vane assembly 700.

Figure 8:
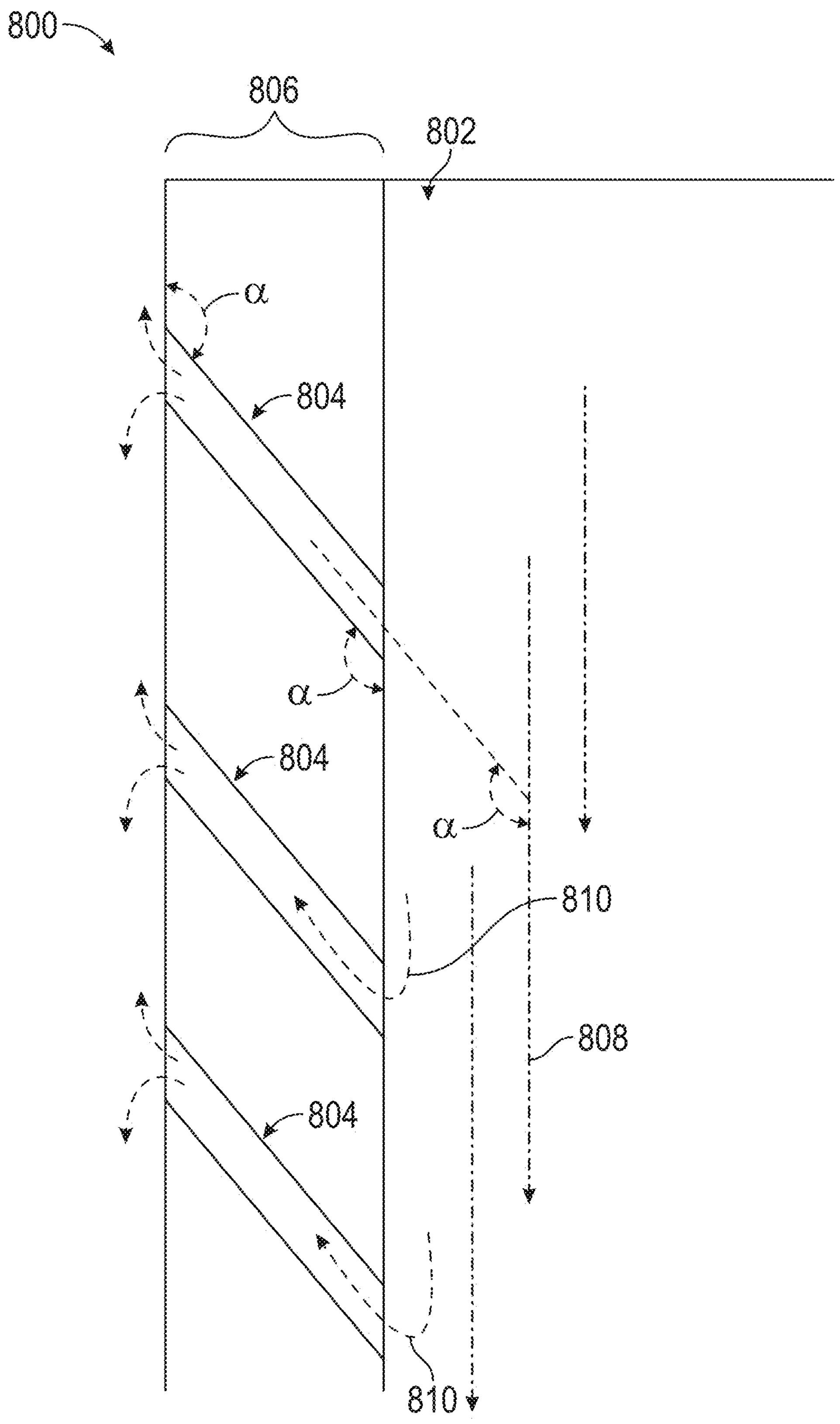
FIG. 8 is a schematic illustration of a portion of a vane in accordance with an embodiment of the present disclosure.

Referring now to FIG. 8, a schematic portion of a vane 800 in accordance with an embodiment of the present disclosure is shown. FIG. 8 is an enlarged portion of a leading edge 806 of the vane 800 illustrating detail of film cooling holes 804 in accordance with some embodiments of the present disclosure. As noted above, the vanes may include film cooling holes for forming a film of cooling air on an exterior surface of the vane. The cooling air may be directly supplied into a leading-edge cavity 802 and/or may first be impinged upon an interior surface of the vane 800 and then flowing radially inward and expelling outward through one or more film cooling holes 804. The film cooling holes 804 may be formed in and through the material of the vane 800 along a leading edge 806 of the vane 800 and/or along surfaces that extend aftward from the leading edge 806 of the vane 800.

To prevent particulate matter from passing through the film cooling holes 804 and ensure that such particulate matter stay entrained with a cooling flow 808 passing through the leading-edge cavity 802, the film cooling holes 804 may be angled in a direction away from the direction of flow 808. As such, the film cooling air 810 must turn at least 90° from the direction of flow 808 to enter and pass through the film cooling holes 804. As shown, the film cooling holes 804 are angled at an angle $\alpha$ relative to the direction of flow 808. The angle $\alpha$ may be 90° or greater relative to the direction of flow 808. In some embodiments, the angle $\alpha$ may be 145° or greater than the direction of flow 808. In some embodiments, the angle $\alpha$ may be 135° or greater than the direction of flow 808. The angle $\alpha$ may also define an angle of the film cooling holes 804 relative to the interior and/or exterior surfaces of the vane 800. As a result, the film cooling flow 810 will turn about the angle $\alpha$ relative to the primary cooling flow direction 808 and then will exit the film cooling holes 804 in a direction that is radially outward (during operation). The turn of the film cooling flow 810 to enter and pass through the film cooling holes 804 and the radial outward flow direction thereof may prevent any particulate matter carried in the cooling flow from entering and/or lodging in the film cooling holes 804. As such, the particulate mater will be carried radially inward and carried into and through a purge manifold and/or inner diameter flow path, and subsequently purged to a hot gas path.

Advantageously, embodiments of the present disclosure are directed to improved cooling and purging schemes for vane assemblies of gas turbine engines. In accordance with embodiments of the present disclosure, a cooling flow for a vane may be provided through a baffle or the like and passed from an outer diameter to an inner diameter within the vane. By directed a throughflow through a portion of a leading-edge cavity, particulate matter carried on the cooling flow may be directed through the vane and to an inner diameter flow aperture which may be fluidly coupled to a purge cavity and/or an inner diameter flow path. The inner diameter flow path may then turn the flow in a direction of rotation of a downstream disc (e.g., operate as a TOBI) and direct the cooling air and any carried particulate matter into a rotor cavity between the vane assembly and a downstream or axially aft rotor disc. The air may be then purged from the rotor cavity and into a hot gas path, where such particulate matter will be less impactful to cooling schemes (e.g., will not build up within the vane and/or clog cooling holes of the vane).

The pressure of the cooling flow within the leading-edge cavity of the vane may be maintained at appropriate levels by the inclusion of a space eater baffle that increases in cross-sectional area (relative to a flow direction) and thus decreases the cross-sectional area of the leading-edge cavity. As the space is reduced, the pressure of the flow is maintained sufficiently to flow into and through the purge cavity and/or the inner diameter flow path and enter the rotor cavity. Such relatively high-pressure air will then purge the rotor cavity of both cooling air and any carried particulate matter. Accordingly, improved cooling schemes and improved part life may be achieved by embodiments of the present disclosure.

The use of the terms “a”, “an”, “the”, and similar references in the context of description (especially in the context of the following claims) are to be construed to cover both the singular and the plural, unless otherwise indicated herein or specifically contradicted by context. The modifier “about” used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. As used herein, the terms “about” and “substantially” are intended to include the degree of error associated with measurement of the particular quantity based upon the equipment available at the time of filing the application. For example, the terms may include a range of ±8%, or 5%, or 2% of a given value or other percentage change as will be appreciated by those of skill in the art for the particular measurement and/or dimensions referred to herein. It should be appreciated that relative positional terms such as “forward,” “aft,” “upper,” “lower,” “above,” “below,” and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the spirit and scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description but is only limited by the scope of the appended claims.

What is claimed is:

1. A vane assembly comprising:

a vane having an outer diameter end and an inner diameter end, the vane defining at least a leading-edge cavity therein, wherein a direction of flow through the leading-edge cavity is from the outer diameter end toward the inner diameter end;

an inner diameter platform arranged at the inner diameter end of the vane, the inner diameter platform having an inner diameter flow path comprising an exit at an aft side of the inner diameter platform, the inner diameter platform having an inner diameter flow aperture fluidly coupling the leading-edge cavity and the inner diameter flow path, wherein the inner diameter flow path is defined within the inner diameter platform and extends between the inner diameter flow aperture and the exit; and a baffle installed within the leading-edge cavity, the baffle arranged to reduce a cross-sectional area in the direction of flow through the leading-edge cavity such that a leading-edge portion of the leading-edge cavity between an exterior surface of the baffle and an interior surface of the vane has a larger cross-sectional area proximate the outer diameter end than at the inner diameter end, wherein an impingement flow is directed into the baffle and a throughflow is directed into the leading-edge portion of the leading-edge cavity between the exterior surface of the baffle and the interior surface of the vane, and wherein the inner diameter flow aperture is positioned at least on the inner diameter platform between the exterior surface of the baffle and the interior surface of the vane and configured to provide a flow path for the throughflow from the leading-edge portion of the leading-edge cavity into the inner diameter flow path, wherein the through flow flows from the outer diameter end, through the leading-edge portion of the leading-edge cavity, and into the inner diameter flow aperture.

2. The vane assembly of claim 1, further comprising a purge cavity defined within the inner diameter platform between the inner diameter flow aperture and the inner diameter flow path.

3. The vane assembly of claim 2, further comprising a second vane having a second leading-edge cavity fluidly coupled to the purge cavity by a second inner diameter flow aperture that fluidly couples the purge cavity to the second leading-edge cavity.

4. The vane assembly of claim 2, wherein the purge cavity is fluidly coupled to a plurality of leading-edge cavities of a plurality of respective vanes.

5. The vane assembly of claim 1, wherein the inner diameter flow path is curved such that airflow passing through the inner diameter flow path is turned as it flows from the inner diameter flow aperture to the exit of the inner diameter flow path.

6. The vane assembly of claim 1, wherein the vane comprises a plurality of film cooling holes formed in a wall of the vane defining the leading-edge cavity.

7. The vane assembly of claim 6, wherein the film cooling holes are angled at an angle of 90° or greater in a direction away from the direction of flow, such that flow entering the film cooling holes must turn at the angle of 90° or greater from the direction of flow.

8. The vane assembly of claim 7, wherein the angle is 145° or greater.

9. The vane assembly of claim 1, wherein the baffle comprises a plurality of impingement holes arranged to direct an impingement flow at an internal surface of a wall of the vane that defines the leading-edge cavity.

10. The vane assembly of claim 1, wherein the vane comprises a plurality of thermal transfer augmentation features arranged on an internal surface of the vane defining the leading-edge cavity.

11. A gas turbine engine comprising:

a turbine section comprising at least one vane assembly and at least one rotor arranged downstream from the at least one vane assembly, wherein a rotor cavity is defined between the at least one vane assembly and the at least one rotor, wherein the at least one vane assembly comprises:

a vane having an outer diameter end and an inner diameter end, the vane defining at least a leading-edge cavity therein, wherein a direction of flow through the leading-edge cavity is from the outer diameter end toward the inner diameter end;

an inner diameter platform arranged at the inner diameter end of the vane, the inner diameter platform having an inner diameter flow path comprising an exit at an aft side of the inner diameter platform that fluidly couples to the rotor cavity, the inner diameter platform having an inner diameter flow aperture fluidly coupling the leading-edge cavity and the inner diameter flow path, wherein the inner diameter flow path is defined within the inner diameter platform and extends between the inner diameter flow aperture and the exit; and a baffle installed within the leading-edge cavity, the baffle arranged to reduce a cross-sectional area in the direction of flow through the leading-edge cavity such that a leading-edge portion of the leading-edge cavity between an exterior surface of the baffle and an interior surface of the vane has a larger cross-sectional area proximate the outer diameter end than at the inner diameter end, wherein an impingement flow is directed into the baffle and a throughflow is directed into the leading-edge portion of the leading-edge cavity between the exterior surface of the baffle and the interior surface of the vane, and wherein the inner diameter flow aperture is positioned at least on the inner diameter platform between the exterior surface of the baffle and the interior surface of the vane and configured to provide a flow path for the throughflow from the leading-edge portion of the leading-edge cavity into the inner diameter flow path, wherein the through flow flows from the outer diameter end, through the leading-edge portion of the leading-edge cavity, and into the inner diameter flow aperture.

12. The gas turbine engine of claim 11, further comprising a purge cavity defined within the inner diameter platform between the inner diameter flow aperture and the inner diameter flow path.

13. The gas turbine engine of claim 12, further comprising a second vane having a second leading-edge cavity fluidly coupled to the purge cavity by a second inner diameter flow aperture that fluidly couples the purge cavity to the second leading-edge cavity.

14. The gas turbine engine of claim 12, wherein the purge cavity is fluidly coupled to a plurality of leading-edge cavities of a plurality of respective vanes.

15. The gas turbine engine of claim 11, wherein the inner diameter flow path is curved such that airflow passing through the inner diameter flow path is turned as it flows from the inner diameter flow aperture to the exit of the inner diameter flow path.

16. The gas turbine engine of claim 11, wherein the vane comprises a plurality of film cooling holes formed in a wall of the vane defining the leading-edge cavity.

17. The gas turbine engine of claim 16, wherein the film cooling holes are angled at an angle of 90° or greater in a direction away from the direction of flow, such that flow entering the film cooling holes must turn at the angle of 90° or greater from the direction of flow.

18. The gas turbine engine of claim 17, wherein the angle is 145° or greater.

19. The gas turbine engine of claim 11, wherein the baffle comprises a plurality of impingement holes arranged to direct an impingement flow at an internal surface of a wall of the vane that defines the leading-edge cavity.

20. The gas turbine engine of claim 11, wherein the vane comprises a plurality of thermal transfer augmentation features arranged on an internal surface of the vane defining the leading-edge cavity.

* * * * *